(No Model.)
G. A. NEILL.
HOG TROUGH.
No. 581,608.  Patented Apr. 27, 1897.
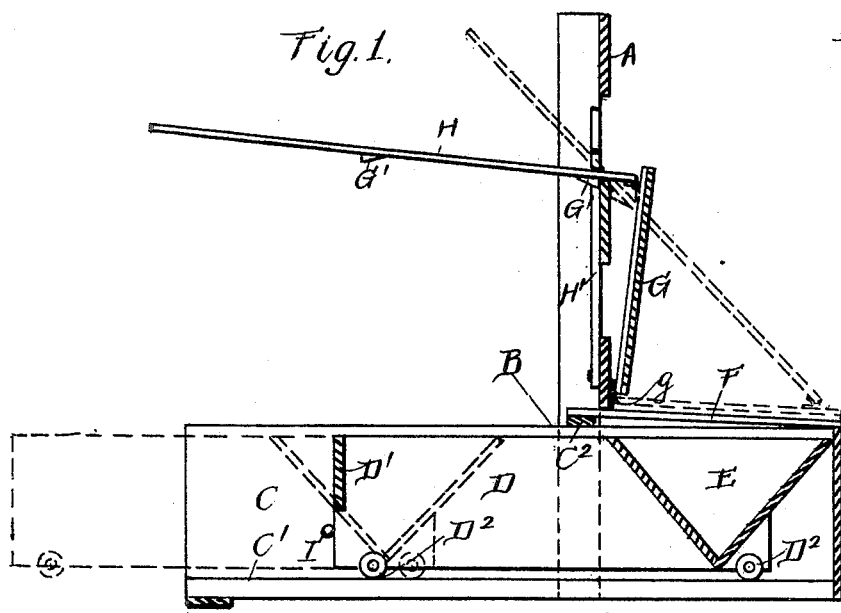
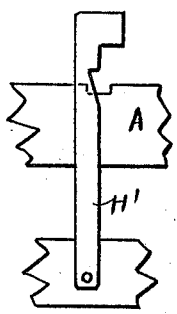
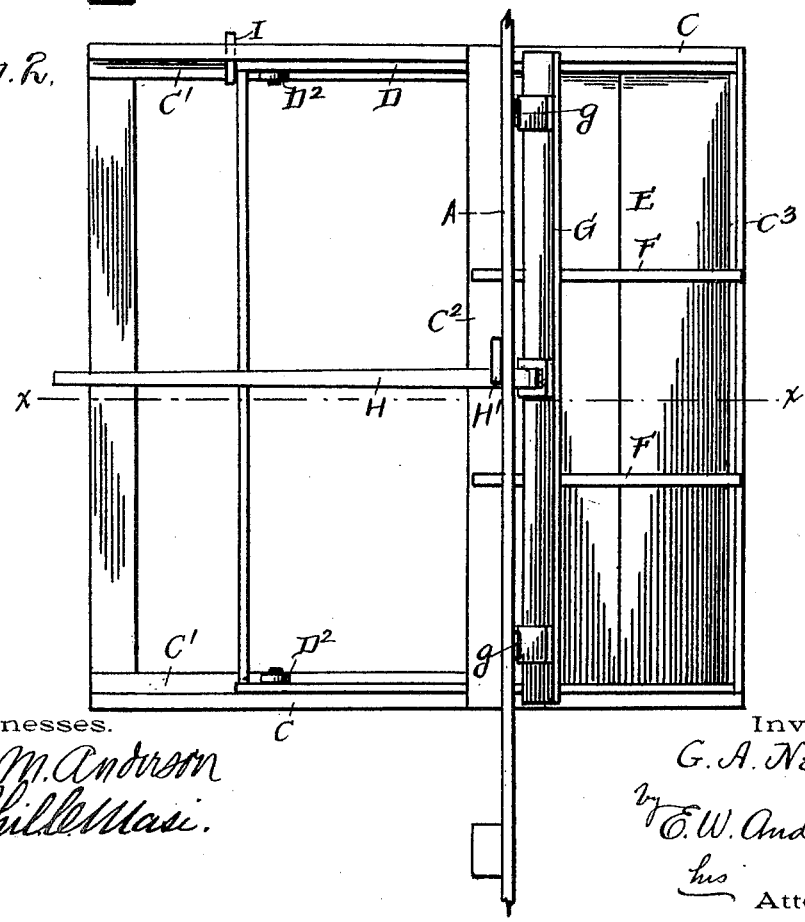
Witnesses.
G. M. Anderson
Phill Masi
Inventor.
G. A. Neill,
by E. W. Anderson,
his Attorney.

UNITED STATES PATENT OFFICE.

GEORGE A. NEILL, OF TEHUACANA, TEXAS.

HOG-TROUGH.

SPECIFICATION forming part of Letters Patent No. 581,608, dated April 27, 1897.

Application filed December 19, 1896. Serial No. 616,294. (No model.)

*To all whom it may concern:*

Be it known that I, GEORGE A. NEILL, a citizen of the United States, and a resident of Tehuacana, in the county of Limestone and State of Texas, have invented certain new and useful Improvements in Hog-Troughs; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a section on line $x\,x$, Fig. 2, trough-cover shown down in dotted lines and trough shown drawn back in dotted lines. Fig. 2 is a plan view of the invention as in application, and Fig. 3 is a detail view of catch.

This invention has relation to certain new and useful improvements in hog-troughs, the principal objects being to secure cleanliness, greater convenience and economy in feeding, and durability.

With these objects in view the invention consists in the novel construction and combination of parts, all as hereinafter described, and pointed out in the appended claims.

Referring to the accompanying drawings, the letter A designates the wall or fence of an ordinary hog pen or pound, which is cut away at one side, as indicated at B, or has a plank removed to admit therethrough a trough-supporting frame C. Said frame extends partially within the pen, resting upon the ground or floor thereof, and is formed with lateral guides or slideways $C'$, upon which rests a trough-frame D, carrying a trough E. In the construction shown the frame C consists of two parallel side pieces, upon the inner sides of which the said guides or slideways are formed, a board or plank $C^2$, which connects the inner ends of the side pieces, and a cross-bar C or brace $C^3$.

The trough-frame D consists of two side pieces, which are arranged to slide on the guides or ways $C'$, and a cross-bar $D'$, which connects the outer ends of said side pieces. The trough E is supported transversely between the inner end portions of the side pieces and may be of any suitable size or shape.

F designates a series of division-strips which extend transversely across the trough at intervals for the purpose of preventing the animals from getting into and lying in the trough; also to keep them from pushing and knocking each other while eating. The strips are secured to the plank or board $C^2$ and to a transverse bar or strip $C^3$ in a manner to permit the trough to slide freely underneath them. When the trough is of considerable length or heavy, the frame D may be mounted to run on rollers $D^2$, as indicated in the drawings.

G is a trough-cover which is hinged to the inner side of the wall or fence A, as indicated at $g\,g$.

H is a handle which is hingedly connected to the cover and extends out through an opening or crack in the wall or fence. This handle is provided with lock-shoulders $G'$, which are designed to engage an edge of the opening through which the handle extends to hold the cover in closed or raised position, as may be desired.

$H'$ is a latch device which is designed to engage the handle to prevent it from being accidentally moved to disengage the lock-shoulders.

I is a pin or peg which is inserted behind the frame D to prevent said frame and the trough from being pushed back out of the pen.

In feeding or watering the animals the trough-cover G is closed down and fastened. The trough-frame, with the trough, is then pulled out of the pen, the trough cleaned and filled, and then pushed back into the pen. The cover is then raised to give the animals access to the pen and is locked in that position.

The advantages of the invention in the way of cleanliness and convenience and economy in feeding will be obvious. Between feeding-times the trough may be drawn back out of the pen, where the animals cannot reach it to tear it to pieces, as is the case with the usual stationary troughs. The trough can be constructed very cheaply and can be applied to pens or pounds of various kinds.

I do not wish to limit myself to the particular construction and arrangement of parts herein shown and described, as the same may be varied without departing from the spirit and scope of my invention.

Having thus described my invention, what

I claim as new, and desire to secure by Letters Patent, is—

1. The combination with an animal pen or pound, of the frame inserted through the wall or fence thereof, said frame being closed across its inner end, the feed-trough fitted to slide in said frame, the cover hinged to said wall or fence and arranged to cover either the trough or the inner portion of the said frame, when the trough is withdrawn, means for actuating said cover, and means for locking the same in open and closed positions, substantially as specified.

2. The combination with an animal pen or pound having an opening in one side, of a frame inserted through the said opening and having guides or slideways and having a closed inner end, a frame fitted to move thereon, a feed-trough carried by said frame, a cover hinged to the wall or fence of the pen or pound and arranged to close the trough and also the inner portion of the guide-frame when the trough is withdrawn, a handle attached to the same, means for locking said handle in different positions, and division-strips inside the pen arranged to extend across the top of the trough, substantially as specified.

In testimony whereof I affix my signature in presence of two witnesses.

GEORGE A. NEILL.

Witnesses:
A. J. NELSON,
WM. MCKINNY.